(12) United States Patent
Kim et al.

(10) Patent No.: US 12,282,204 B2
(45) Date of Patent: Apr. 22, 2025

(54) IMAGE CAPTURING DEVICE FOR PERFORMING AUTOFOCUS

(71) Applicant: HANWHA TECHWIN CO., LTD., Seongnam-si (KR)

(72) Inventors: Daebong Kim, Seongnam-si (KR); Seonggon Kim, Seongnam-si (KR); Junho Gal, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 290 days.

(21) Appl. No.: 18/010,718

(22) PCT Filed: Apr. 5, 2021

(86) PCT No.: PCT/KR2021/004199
§ 371 (c)(1),
(2) Date: Jun. 8, 2023

(87) PCT Pub. No.: WO2022/004991
PCT Pub. Date: Jan. 6, 2022

(65) Prior Publication Data
US 2023/0324651 A1  Oct. 12, 2023

(30) Foreign Application Priority Data
Jul. 2, 2020  (KR) .................. 10-2020-0081438

(51) Int. Cl.
*G02B 7/36* (2021.01)
*G03B 13/36* (2021.01)
*H04N 23/67* (2023.01)
(52) U.S. Cl.
CPC .............. *G02B 7/36* (2013.01); *G03B 13/36* (2013.01); *H04N 23/675* (2023.01)

(58) Field of Classification Search
CPC ........ G02B 7/36; G03B 13/36; H04N 23/675; H04N 23/61; H04N 23/959
See application file for complete search history.

(56) References Cited

U.S. PATENT DOCUMENTS

2008/0159728 A1   7/2008  Wu et al.
2008/0273869 A1*  11/2008  Lukyanov ................ G03B 3/00
                                                      396/125

(Continued)

FOREIGN PATENT DOCUMENTS

JP    2004-309653 A    11/2004
KR    10-2008-0024680 A    3/2008
(Continued)

OTHER PUBLICATIONS

Search Report (PCT/ISA/210) issued Jun. 21, 2021 by the International Searching Authority for International Patent Application No. PCT/KR2021/004199.

(Continued)

*Primary Examiner* — Shahbaz Nazrul
(74) *Attorney, Agent, or Firm* — Sughrue Mion, PLLC

(57) ABSTRACT

An image capturing device includes a lens, a lens driver configured to change a focus position by moving the lens, an image sensor configured to detect light passed through the lens, and a focus controller configured to control, based on an image generated by the image sensor, the lens driver to adjust the focus position. The focus controller is further configured to: monitor a feature change of a saturated object having an intensity greater than or equal to a threshold value, in each of a plurality of regions of an image, by adjusting the focus position; and adjust the focus position based on a trend of the feature change of the saturated object while the focus position is changed in a direction.

20 Claims, 12 Drawing Sheets

(56) References Cited

U.S. PATENT DOCUMENTS

| | | | |
|---|---|---|---|
| 2010/0045849 A1 | 2/2010 | Yamasaki | |
| 2015/0281557 A1* | 10/2015 | Hirosawa | H04N 23/72 |
| | | | 348/208.12 |
| 2018/0007256 A1* | 1/2018 | Yoshino | A61B 1/06 |
| 2018/0321464 A1* | 11/2018 | Kogo | H04N 23/673 |

FOREIGN PATENT DOCUMENTS

| | | |
|---|---|---|
| KR | 10-2011-0103794 A | 9/2011 |
| KR | 10-2020-0047971 A | 5/2020 |
| WO | 2016/137273 A1 | 9/2016 |

OTHER PUBLICATIONS

Written Opinion (PCT/ISA/237) issued Jun. 21, 2021 by the International Searching Authority for International Patent Application No. PCT/KR2021/004199.

* cited by examiner

IMAGE CAPTURING DEVICE FOR PERFORMING AUTOFOCUS

TECHNICAL FIELD

The disclosure relates to an electronic device, and more particularly, to an image capturing device for performing autofocus, and an operating method of the image capturing device.

BACKGROUND ART

As cameras or various electronic devices including cameras have become popular, there is a frequent phenomenon that users keep pictures taken by themselves in a multimedia device or upload the pictures on the web.

Cameras may include an autofocus (AF) function that automatically adjusts a focal point. For AF, a contrast detection method, an infrared method, a through the lens (TTL) method, etc. may be used. The contrast detection method is a technique that calculates signal values from captured images and performs an AF operation by using the calculated signal values, and has become widely used as a calculating speed of cameras has improved.

The aspects described above are provided only for helping understand the background techniques of the technical concepts of the disclosure, and thus, the described aspects shall not be understood as the content corresponding to the prior art known to one of ordinary skill in the art.

DESCRIPTION OF EMBODIMENTS

Technical Problem

Embodiments of the disclosure provide an image capturing device and method for detecting an in-focus position with improved speed and accuracy.

Solution to Problem

An image capturing device according to an embodiment of the disclosure includes: a lens; a lens driver configured to change a focus position by moving the lens; an image sensor configured to detect light passed through the lens; and a focus controller configured to control, based on an image generated by the image sensor, the lens driver to adjust the focus position, wherein the focus controller is further configured to: detect a saturated object having an intensity greater than or equal to a threshold value, in each of a plurality of regions of the image; from among regions in which the saturated objects are detected from among the plurality of regions, select regions having a same trend of a feature change of the saturated objects while the focus position is changed in a direction, as first regions, and adjust the focus position based on the feature change of the saturated objects detected in the first regions.

The focus controller may further be configured to select regions in which saturated objects, an area of each of which is gradually decreased while the focus position is changed in the direction, are detected, as the first regions, and adjust the focus position such that the areas of the saturated objects detected in the first regions are minimized.

The area of each saturated object may correspond to the number of pixels included in the saturated object.

The focus controller may further be configured to: calculate an average value and a variance value of pixel values of pixels included in the saturated objects; and select regions in which there are saturated objects having a same increase and decrease direction of at least one of the average value and the variance value while the focus position is changed in the direction, as the first regions, and adjust the focus position such that the average value of the saturated objects detected in the first regions is maximized, and the variance value is minimized.

The focus controller may further be configured to: calculate a direct current value and an alternating current value by performing discrete cosine transformation on the saturated objects; and select regions in which saturated objects having a same increase and decrease direction of at least one of the direct current value and the alternating current value while the focus position is changed in the direction are detected, as the first regions, and adjust the focus position such that the direct current value of the saturated objects detected in the first regions is maximized, and the alternating current value is minimized.

The focus controller may further be configured to: calculate an average value and a variance value of pixel values of pixels included in the saturated objects; and exclude a first region in which there is a saturated object, the average value of which is increased, and the variance value of which is increased, while the focus position is changed in the direction.

The focus controller may further be configured to: calculate a direct current value and an alternating current value by performing discrete cosine transformation on the saturated objects; and exclude a first region in which there is a saturated object, the direct current value of which is increased, and the alternating current value of which is increased, while the focus position is changed in the direction.

The focus controller may further be configured to: calculate an average value and a variance value of pixel values of pixels included in the saturated objects; and select, from among the plurality of regions, regions in which there are saturated objects, the average value of each of which is increased, and the variance value of each of which is decreased, while the focus position is changed in the direction, and from among the selected regions, select regions in which saturated objects, an area of each of which is gradually decreased, are detected, as the first regions.

The focus controller may further be configured to: calculate a direct current value and an alternating current value by performing discrete cosine transformation on the saturated objects; and select, from among the plurality of regions, regions in which there are saturated objects, the direct current value of each of which is increased, and the alternating current value of each of which is decreased, while the focus position is changed in the direction, and from among the selected regions, select regions in which saturated objects, an area of each of which is gradually decreased, are detected, as the first regions.

The focus controller may further be configured to detect the saturated objects having an intensity greater than or equal to the threshold value, when a low illumination environment in which there is spot light is determined.

The focus controller may further be configured to detect pixels greater than or equal to the threshold value in each of the plurality of regions and group the detected pixels to detect the saturated objects.

A method of changing a focus position of a camera according to an embodiment of the disclosure includes: detecting a saturated object having an intensity greater than or equal to a threshold value, in each of a plurality of regions of an image obtained by the camera; from among regions in which the saturated objects are detected from among the plurality of regions, selecting regions having a same trend of a feature change of the saturated objects while the focus position is changed in a direction, as first regions; and adjusting the focus position based on the feature change of the saturated objects detected in the first regions.

The selecting of the first regions may include selecting regions in which saturated objects, an area of each of which is gradually decreased while the focus position is changed in the direction, are detected, as the first regions, and the adjusting of the focus position may include adjusting the focus position such that the areas of the saturated objects detected in the first regions are minimized.

The area of each saturated object may correspond to the number of pixels included in the saturated objects.

The method may further include calculating an average value and a variance value of pixel values of pixels included in the saturated objects, wherein the selecting of the first regions may include selecting regions in which there are saturated objects having a same increase and decrease direction of at least one of the average value and the variance value while the focus position is changed in the direction, as the first regions, and the adjusting of the focus position may include adjusting the focus position such that the average value of the saturated objects detected in the first regions is maximized, and the variance value is minimized.

The method may further include calculating a direct current value and an alternating current value by performing discrete cosine transformation on the saturated objects, wherein the selecting of the first regions may include selecting regions in which saturated objects having a same increase and decrease direction of at least one of the direct current value and the alternating current value while the focus position is changed in the direction are detected, as the first regions, and the adjusting of the focus position may include adjusting the focus position such that the direct current value of the saturated objects detected in the first regions is maximized, and the alternating current value is minimized.

The method may further include calculating an average value and a variance value of pixel values of pixels included in the saturated objects, wherein the selecting of the first regions may include selecting, from among the plurality of regions, regions in which there are saturated objects, the average value of each of which is increased, and the variance value of each of which is decreased, while the focus position is changed in the direction, and from among the selected regions, selecting regions in which saturated objects, an area of each of which is gradually decreased, are detected, as the first regions.

The method may further include calculating a direct current value and an alternating current value by performing discrete cosine transformation on the saturated objects, wherein the selecting of the first regions may include selecting, from among the plurality of regions, regions in which there are saturated objects, the direct current value of each of which is increased, and the alternating current value of each of which is decreased, while the focus position is changed in the direction, and from among the selected regions, selecting regions in which saturated objects, an area of each of which is gradually decreased, are detected, as the first regions.

The detecting of the saturated objects may include detecting the saturated objects, when a low illumination environment in which there is spot light is determined.

Pixels greater than or equal to the threshold value may be detected in each of the plurality of regions and the detected pixels may be grouped to detect the saturated objects.

An image capturing device according to an embodiment of the disclosure includes: a lens; a lens driver configured to change a focus position by moving the lens; an image sensor configured to detect light passed through the lens; and a focus controller configured to control, based on an image generated by the image sensor, the lens driver to adjust the focus position, wherein the focus controller is further configured to: monitor a saturated area having an intensity greater than or equal to a threshold value in each of a plurality of regions of the image by adjusting the focus position; when there are first regions, the saturated area of each of which is gradually decreased as the focus position is changed, select the first regions and not to select a second region, when the second region, the saturated area of which is increased, is detected; and adjust the focus position by referring to a change of the saturated areas of the first regions, without referring to the second region.

The saturated area may correspond to the number of pixels.

When a position of the lens is changed in a first direction from a first focus position to a second focus position, the saturated area of each of the first regions may be decreased, and the focus controller may further be configured to select the first regions and not to select the second region, in response to the further decreased saturated area of each of the first regions and an increase of the saturated area of the second region, when the position of the lens is changed in the first direction from the second focus position to a third focus position. The focus controller may further be configured to: calculate at least one of an average and a variance of the intensities of the saturated area of each of the plurality of regions; and select the first regions by further referring to a change of at least one of the average and the variance.

The focus controller may further be configured to: calculate a direct current value and an alternating current value by performing discrete cosine transformation on the intensities of the saturated area of each of the plurality of regions; and select the first regions by further referring to a change of at least one of the direct current value and the alternating current value.

The focus controller may further be configured to: calculate at least one of an average and a variance of the intensities of the saturated area of each of the plurality of regions; and adjust the focus position by further referring to a change of at least one of the average and the variance.

The focus controller may further be configured to: calculate a direct current value and an alternating current value by performing discrete cosine transformation on the intensities of the saturated area of each of the plurality of regions; and adjust the focus position by further referring to a change of at least one of the direct current value and the alternating current value.

According to another aspect of the disclosure, a method of changing a focus position by moving a camera lens is provided. The method may include: monitoring a saturated area having an intensity greater than or equal to a threshold value in each of a plurality of regions of an image obtained by detecting light passed through the camera lens, when the focus position is adjusted; when there are first regions, the saturated area of each of which is gradually decreased as the focus position is changed, selecting the first regions and not selecting a second region, when the second region, the saturated area of which is increased, is detected; and adjusting the focus position by referring to a change of the saturated areas of the first regions, without referring to the second region.

Advantageous Effects of Disclosure

According to embodiments of the disclosure, provided are an image capturing device and method for detecting an in-focus position with improved speed and accuracy in a low illumination environment in which there is spot light.

BEST MODE

An image capturing device according to an embodiment of the disclosure includes: a lens; a lens driver configured to change a focus position by moving the lens; an image sensor configured to detect light passed through the lens; and a focus controller configured to control, based on an image generated by the image sensor, the lens driver to adjust the focus position, wherein the focus controller is further configured to: detect a saturated object having an intensity greater than or equal to a threshold value, in each of a plurality of regions of the image; from among regions in which the saturated objects are detected from among the plurality of regions, select regions having a same trend of a feature change of the saturated objects while the focus position is changed in a direction, as first regions, and adjust the focus position based on the feature change of the saturated objects detected in the first regions.

MODE OF DISCLOSURE

Hereinafter, preferable embodiments according to the disclosure are described in detail by referring to the accompanying drawings. It should be noted that in the descriptions below, only aspects that are necessary to understand operations according to the disclosure are described, and descriptions about other aspects are to be omitted in order not to blur the point of the disclosure. Also, the disclosure is not limited to the embodiments described herein and may be implemented in other forms. The embodiments described herein are only provided to convey the technical concept of the disclosure in detail for one of ordinary skill in the art to easily implement the technical concept of the disclosure.

Throughout the specification, when a portion is "connected" to another portion, it may denote not only that the portion is "directly connected" to the other portion, but also that the portion is "indirectly connected" to the other portion with another device therebetween. Terms used herein are to describe particular embodiments and are not used to limit the disclosure. Throughout the specification, when a portion "includes" a component, it may denote that the portion may further include another component, rather than excluding the other component, unless particularly otherwise described. "At least one of X, Y, and Z" and at least one selected from the group consisting of X, Y, and Z" may be interpreted as X, Y, or Z, singularly, or a certain combination of at least two of X, Y, and Z (for example, XYZ, XYY, YZ, or ZZ). Here, "and/or" includes all combinations of one or more corresponding components.

Figure 1:
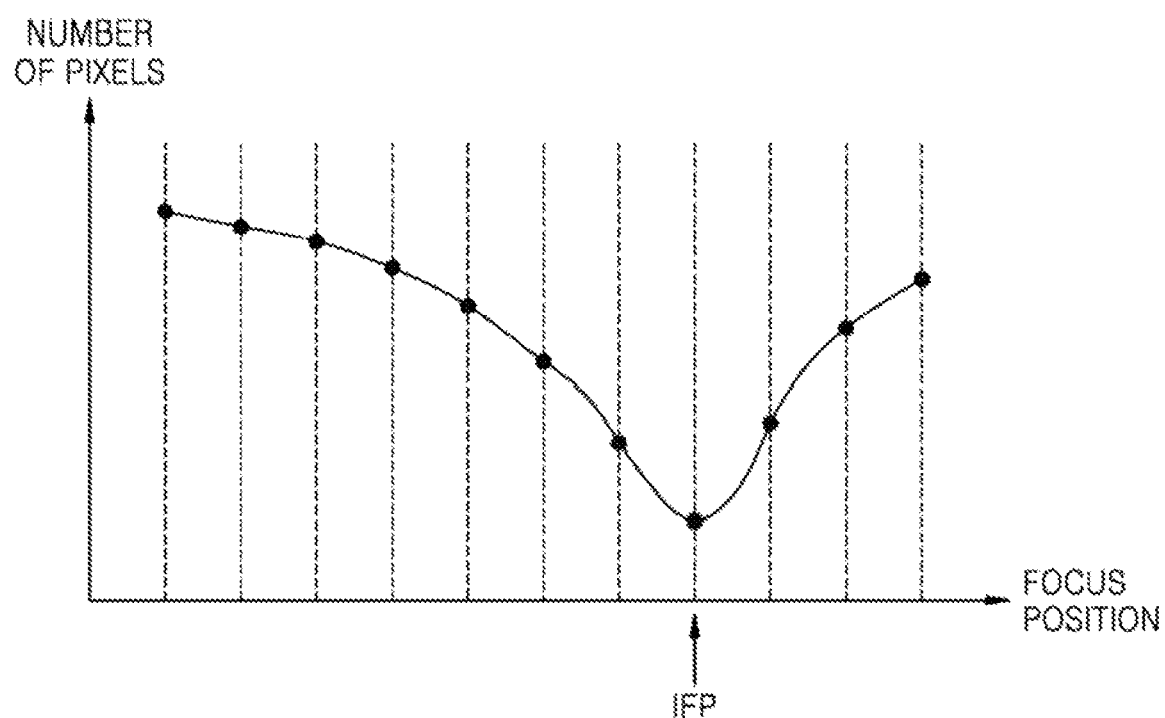
FIG. 1 is a graph showing the number of pixels saturated according to a change of a focus position of a lens.

FIG. 1 is a graph showing the number of pixels saturated according to a change of a focus position of a lens.

Referring to FIG. 1, the number of saturated pixels included in an image may be changed according to the focus position of the lens. The saturated pixel denotes a pixel having an intensity higher than a predetermined threshold value among pixels of the image. A relatively large number of saturated pixels denotes that a corresponding image does not appropriately represent objects. For example, such a phenomenon may occur when a camera captures a low illumination environment (hereinafter, referred to as a "spot environment.") in which there is spot light, such as a source headlight, a neon sign, a streetlight, etc. In this case, it is required to adjust the focus position.

In FIG. 1, as the focus position is changed, the number of saturated pixels is decreased, and when the focus position reaches an in-focus (right focus) position (IFP), the number of saturated pixels has a lowest value. As the focus position passes the IFP and continues to be changed in the same direction, the number of saturated pixels is increased. An image capturing device may perform autofocus (AF) that adjusts a lens to be positioned at the IFP or adjacent to the IFP with reference to a change in the number of saturated pixels. This AF method may be effective, when, for example, an image capturing device captures a spot environment, and thus, there are saturated pixels in an image, corresponding to spot light.

Figure 2:
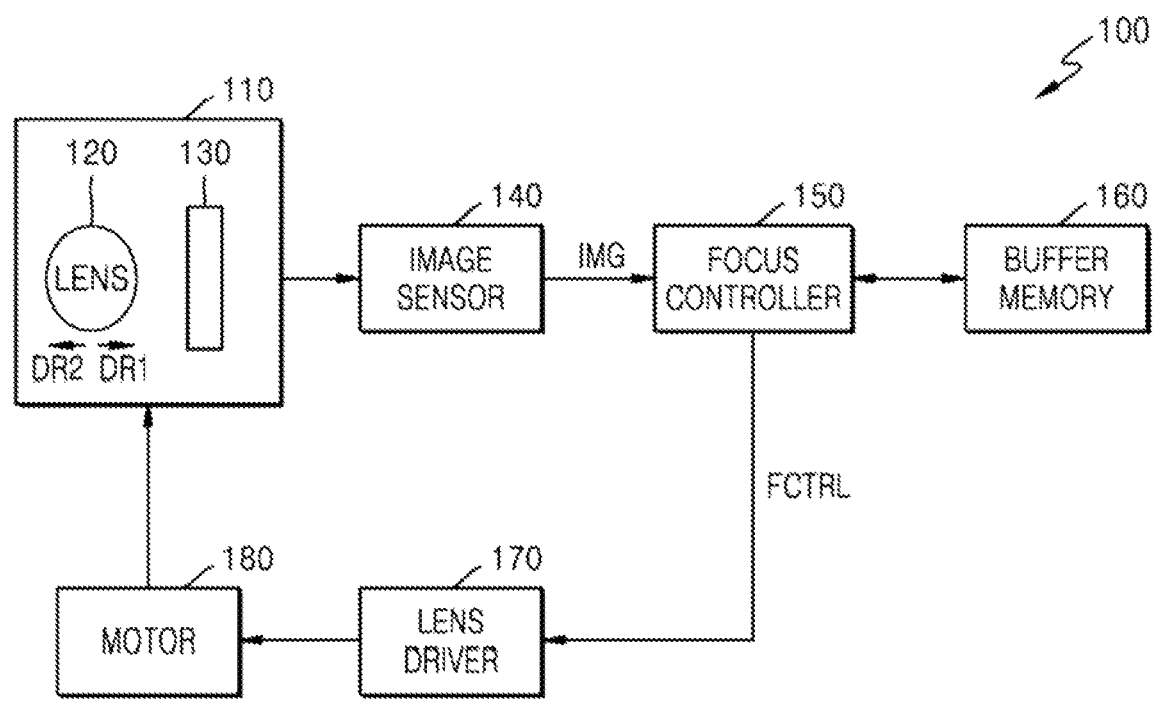
FIG. 2 is a block diagram of an image capturing device according to an embodiment of the disclosure.

FIG. 2 is a block diagram of an image capturing device according to an embodiment of the disclosure.

Referring to FIG. 2, an image capturing device 100 may include a lens portion 110, an image sensor 140, a focus controller 150, a buffer memory 160, a lens driver 170, and a motor 180.

The lens portion 110 may include one or more camera lenses and a filter 130. The camera lenses may allow light from an object to pass through so that an image is formed on an imaging surface (a light-reception surface) of the image sensor 140. The camera lenses may include a focus lens 120 configured to focus light from the object to an imaging surface of the image sensor 140. By adjusting a focus position of the focus lens 120, an image formed on the imaging surface of the image sensor 140 may be adjusted. The filter 130 may include various types of filters configured to capture an optimum image according to a capturing environment. For example, the filter may include a daytime capturing filter and a nighttime capturing filter. In FIG. 2, the filter 130 is positioned between the focus lens 120 and the image sensor 140. However, according to another embodiment, the filter 130 may be positioned at a front end of the focus lens 120. The focus position may denote a relative position of the focus lens 120 with respect to the capturing surface of the image sensor 140. According to embodiments, the lens driver 170 may control the motor 180 to shift the focus position of the focus lens 120 in a first direction DR1 toward the image sensor 140 or a second direction DR2 that is a direction opposite to the first direction DR1, thereby adjusting an image formed on the capturing image surface of the image sensor 140.

The image sensor 140 may detect light arriving from the lens portion 110 and generate an image IMG (or a frame). According to embodiments, the image sensor 140 may include sensor units configured to generate image signals corresponding to detected light and an analog-to-digital converter configured to convert analog image signals from the sensor units to digital signals. The sensor units may include at least one of various types of sensor arrays implementing a charge-coupled-device (CCD) method, a complementary metal-oxide semi-conductor (CMOS) method, etc.

The focus controller 150 may receive the image IMG from the image sensor 140. The focus controller 150 may adjust the focus position of the focus lens 120 based on each image IMG obtained by adjusting the focus position. The focus controller 150 may adjust the focus position by transmitting a focus control signal FCTRL to the lens driver 170. The lens driver 170 may be configured to control mechanical motions of the motor 180, in response to the focus control signal FCTRL, and the motor 180 may include a mechanical mechanism and shift the lens 120 according to control by the lens driver 170.

When the focus controller 150 determines that it is a spot environment, the focus controller 150 may detect a saturated portion in the image IMG and may determine an in-focus position based on a change of an area of the saturated portion detected in the image IMG. According to an embodiment, the focus controller 150 may determine that it is a spot environment, when the number of pixels (saturated pixels) having an intensity higher than a predetermined threshold value in the image IMG is greater than or equal to a threshold number. The focus controller 150 may detect the change of the area of the saturated portion in the image IMG and may determine a focus position when the area is relatively small (for example, the minimum) as the in-focus position. The saturated portion may denote an object (hereinafter, referred to as a "saturated object.") having a relatively high intensity (or brightness) in the image IMG. The saturated object may be spot light or light reflected from the spot light and hereinafter is also referred to as a "spot." According to an embodiment, the focus controller 150 may detect pixels having an intensity higher than a predetermined threshold value and may detect a saturated portion in which the detected pixels are grouped as an object. A plurality of saturated objects may be detected in the image IMG.

The intensity may be any one intensity (or brightness) from among various domains based on the image IMG. The image IMG may include red, green, and blue color pixels, such as the Bayer-domain, and the intensity may be an intensity of these color pixels. According to embodiments, the focus controller 150 may include a converter configured to convert the color pixels of the Bayer domain into color pixels on the YUV color space, and the above intensity may be an intensity of these color pixels.

The focus controller 150 may detect a saturated object in each of a plurality of regions of the image IMG. Here, the plurality of regions may be predetermined regions spatially divided in the image IMG regardless of the saturated objects detected in the image IMG. Alternatively, the plurality of regions may be varying regions spatially divided in the image IMG, according to the saturated objects detected in the image IMG.

The focus controller 150 may monitor a change in area or a change in size of the saturated object detected in each region. When a focus position is changed, and areas (hereinafter, referred to as "saturated areas") of the saturated objects are decreased, the focus controller 150 may further shift the focus position in the same direction. However, when the focus position is changed, and the saturated areas are increased, the focus controller 150 may shift the focus position in the opposite direction. A shifting distance of the focus position may be determined according to various factors, such as the amount of change of the saturated areas.

The focus controller 150 may detect, in the image IMG, a region in which the saturated areas are continually decreased, and on the contrary, a region in which the saturated areas are continually increased, as the focus position is shifted in a predetermined direction. In this case, the focus controller 150 may exclude the region in which the saturated areas are increased, for determining the focus position. For example, the focus controller 150 may exclude a reference to the increased saturated areas and refer to the continually decreased saturated areas, to further shift the focus position in the same direction. The focus controller 150 may exclude a region in which the saturated object is not detected and may monitor a change in the saturated area with respect to a region in which the saturated object is detected.

The focus controller 150 may be connected to the buffer memory 160. The focus controller 150 may store data generated according to the operations described herein in the buffer memory 160 and read the data from the buffer memory 160. For example, the focus controller 150 may detect the saturated object in each of the regions of the image IMG and may extract area information of the saturated object to store the extracted area information in the buffer memory 160 and read the stored data from the buffer memory 160. The area information may include detection information of the saturated object, for example, the region in which the saturated object is detected, a saturated area, a change value of the saturated area, etc. The focus controller 150 may further extract a representative value of each saturated object of the image IMG, for example, an average value, a variance value, discrete cosine transformation (DCT) data (a direct current (DC) element and an alternating current (AC) element), etc. of each saturated object, to store the extracted representative value of each saturated object in the buffer memory 160 and read the stored data from the buffer memory 160.

Figure 3:
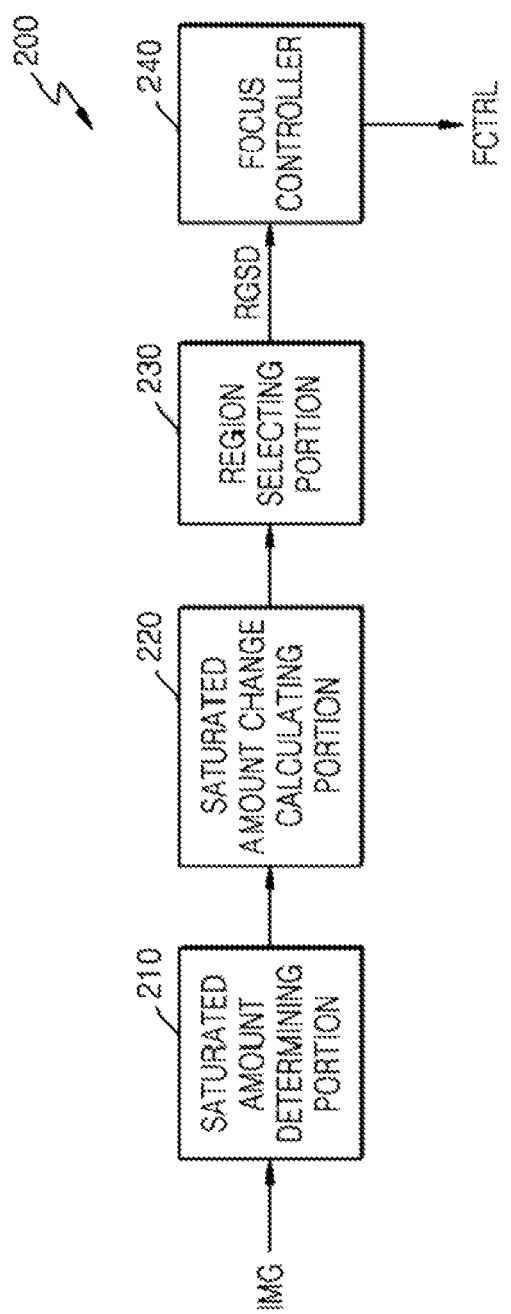
FIG. 3 is a block diagram of a focus controller of FIG. 2, according to an embodiment.
Figure 4:
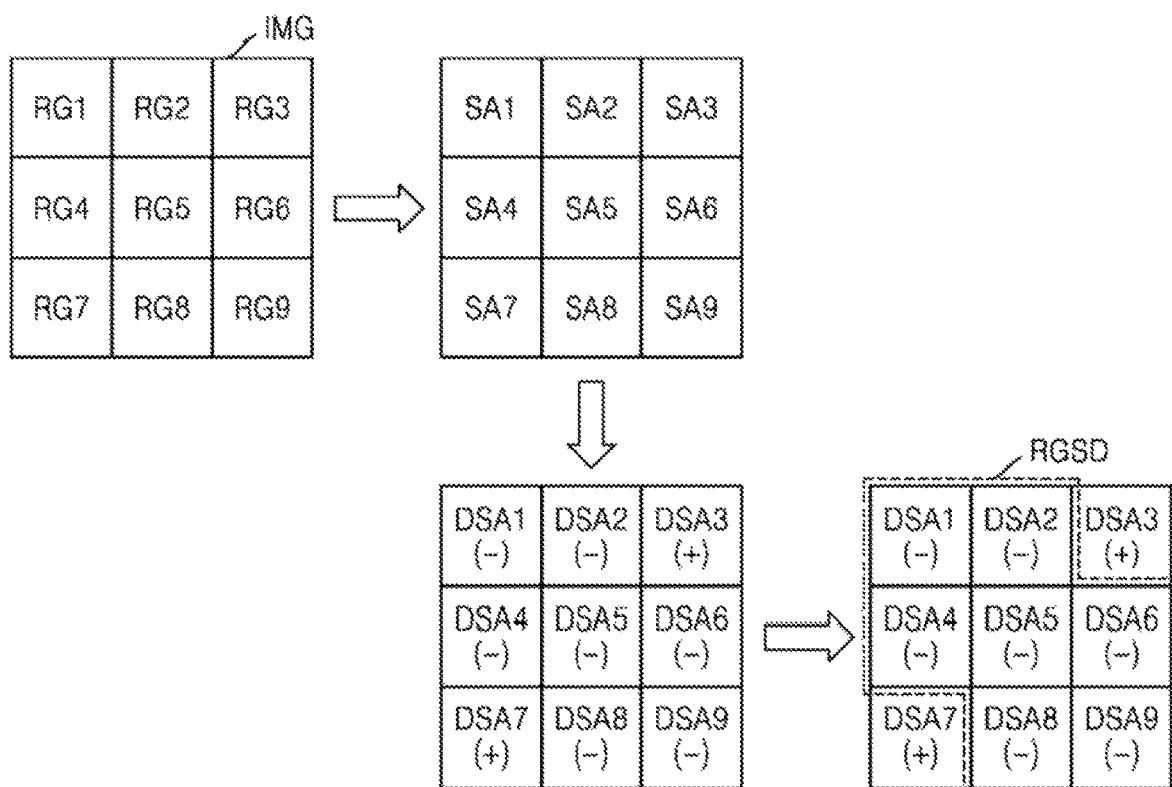
FIG. 4 is a conceptual diagram showing data processed by the focus controller of FIG. 3.

FIG. 3 is a block diagram of the focus controller of FIG. 2, according to an embodiment. FIG. 4 is a conceptual diagram showing data processed by the focus controller of FIG. 3. FIGS. 5A, 5B, 5C, and 5D are diagrams showing images captured in in-focus positions, respectively.

Referring to FIG. 3, the focus controller 200 may include a saturated amount determining portion 210, a saturated amount change calculating portion 220, a region selecting portion 230, and a focus adjusting portion 240.

The saturated amount determining portion 210 may detect at least one saturated object in the image IMG. The saturated amount determining portion 210 may detect pixels having intensities greater than or equal to a threshold value in each of the plurality of regions in the image IMG and may group the detected pixels to detect a saturated object. According to an embodiment, the saturated amount determining portion 210 may generate a binary image in which a value of the detected pixels is 1 and may cluster continuous points in the binary image and remove discontinuous points as noise to detect a saturated object. A method of detecting the saturated object according to an embodiment of the disclosure is not limited to the method described above. The saturated object may be detected in the image IMG based on a well-known spot light detection algorithm.

The saturated amount determining portion 210 may determine a feature of the detected saturated object. According to an embodiment, the saturated amount determining portion 210 may determine an area of the saturated object as the feature of the saturated object and may output area information of the saturated object to the saturated amount change calculating portion 220. The plurality of regions may be predetermined regions divided in the image IMG regardless of the saturated object detected in the image IMG. Alternatively, the plurality of regions may be varying regions divided in the image IMG according to the saturated object detected in the image IMG. When the plurality of regions are varying regions, an identifier may be assigned to each saturated object described herein, a position of the saturated object may be managed with the identifier, and thus, a change of a saturated area may be tracked. Hereinafter, for convenience of explanation, it is assumed that the plurality of regions are predetermined, regardless of a saturated object detected in the image IMG.

Referring to FIGS. 3 and 4 together, the image IMG may be divided into a plurality of regions of n×m. For example, the image IMG may be divided into first to ninth regions RG1 to RG9 of 3×3. The saturated amount determining portion 210 may detect a saturated object in each of the first to ninth regions RG1 to RG9 and may determine first to ninth saturated areas SA1 to SA9 of the detected saturated objects. According to embodiments, the saturated area may correspond to the number of pixels included in the saturated object. The saturated amount determining portion 210 may detect pixels having intensities equal to or greater than a threshold value from among pixels in each of the first to ninth regions RG1 to RG9 and may group the detected pixels to detect the saturated object. The saturated amount determining portion 210 may determine an area (size) of the saturated object detected in each region, according to the number of pixels included in the saturated object. According to embodiments, data (for example, area information) with respect to the first to ninth saturated areas SA1 to SA9 may be stored in the buffer memory 160 (see FIG. 2).

Next, the saturated amount change calculating portion 220 may calculate a feature change of each of the saturated objects detected in the images IMG, which are input according to a time order. According to an embodiment, the feature change may be a change of an area of the saturated object, that is, a change of a saturated area. The saturated amount change calculating portion 220 may calculate change values DSA1 to DSA9 of the first to ninth saturated areas SA1 to SA9 between the current image IMG and a previous image. To this end, the saturated amount change calculating portion 220 may compare the first to ninth saturated areas SA1 to SA9 of the current image IMG with the first to ninth saturated areas SA1 to SA9 of the previous image. Here, the previous image may be an n-$k^{th}$ image captured before an $n^{th}$ image, which is the current image IMG, wherein k may be greater than or equal to 1 (n is an integer greater than 1). The first to ninth change values DSA1 to DSA9 may respectively correspond to the first to ninth regions RG1 to RG9 of the image IMG. Data about the first to ninth change values DSA1 to DSA9 may be stored in the buffer memory 160. According to an embodiment, the change value may be the change of the saturated area, for example, a change of the number of pixels included in the saturated object.

The region selecting portion 230 may be configured to select at least some of the first to ninth regions RG1 to RG9 of the image IMG according to the first to ninth change values DSA1 to DSA9 and to generate region selection data RGSD indicating the selected regions. The generated region selection data RGSD may be transmitted to the focus adjusting portion 240. The region selecting portion 230 may select regions in which there are saturated objects having the same trend (an increase or decrease) of the feature change according to time, and may determine a region in which there is a saturated object having the opposite trend of the feature change as a region in which an irregular or temporary exception condition occurs and may not select the region.

FIG. 4 illustrates that the first, second, fourth, fifth, sixth, eighth, and ninth change values DSA1, DSA2, DSA4, DSA5, DSA6, DSA8, and DSA9 are negative (−) and the third and seventh change values DSA3 and DSA7 are positive (+). In the previous image, the first, second, fourth, fifth, sixth, eighth, and ninth change values DSA1, DSA2, DSA4, DSA5, DSA6, DSA8, and DSA9 may be negative. The saturated areas of the first, second, fourth, fifth, sixth, eighth, and ninth regions RG1, RG2, RG4, RG5, RG6, RG8, and RG9 may be continually decreased, as a focus position is changed in the same direction, as illustrated in FIG. 4. On the contrary, it may be detected in the current image IMG that the saturated areas of the third and seventh regions RG3 and RG7 are increased (or occur). As described above, it may be detected that as the focus position is changed in the same direction, while the saturated areas of at least some regions RG1, RG2, RG4, RG5, RG6, RG8, and RG9 are gradually decreased, the saturated areas of other regions RG3 and RG7 are increased. In this case, the region selecting portion 230 may select the regions RG1, RG2, RG4, RG5, RG6, RG8, and RG9, the saturated areas of which are gradually decreased, for adjusting the focus position, and may exclude (not select) the regions RG3 and RG7, the saturated areas of which are increased.

The focus adjusting portion 240 may adjust the focus position by outputting a focus control signal FCTRL based on the change values DSA1, DSA2, DSA4, DSA5, DSA6, DSA8, and DSA9 of the selected regions RG1, RG2, RG4, RG5, RG6, RG8, and RG9 indicated by the region selection data RGSD. According to embodiments, the focus adjusting portion 240 may adjust the focus position by referring to the saturated areas SA1, SA2, SA4, SA5, SA6, SA8, and SA9 corresponding to the selected regions RG1, RG2, RG4, RG5, RG6, RG8, and RG9 and/or their change values DSA1, DSA2, DSA4, DSA5, DSA6, DSA8, and DSA9. For example, the focus adjusting portion 240 may adjust the focus position such that the saturated areas SA1, SA2, SA4, SA5, SA6, SA8, and SA9 of the selected regions RG1, RG2, RG4, RG5, RG6, RG8, and RG9 are decreased. The focus adjusting portion 240 may reduce the adjusting amount of the focus position as the change values DSA1, DSA2, DSA4, DSA5, DSA6, DSA8, and DSA9 are decreased and/or the saturated areas SA1, SA2, SA4, SA5, SA6, SA8, and SA9 are decreased.

According to embodiments, the saturated amount determining portion 210, the saturated amount change calculating portion 220, the region selecting portion 230, and the focus adjusting portion 240 may be realized as software, hardware, firmware, and a combination thereof and may be separated or integrated according to necessity. According to embodiments, the saturated amount determining portion 210, the saturated amount change calculating portion 220, the region selecting portion 230, and the focus adjusting portion 240 may be included in a system on chip (SoC).

Figure 5A:
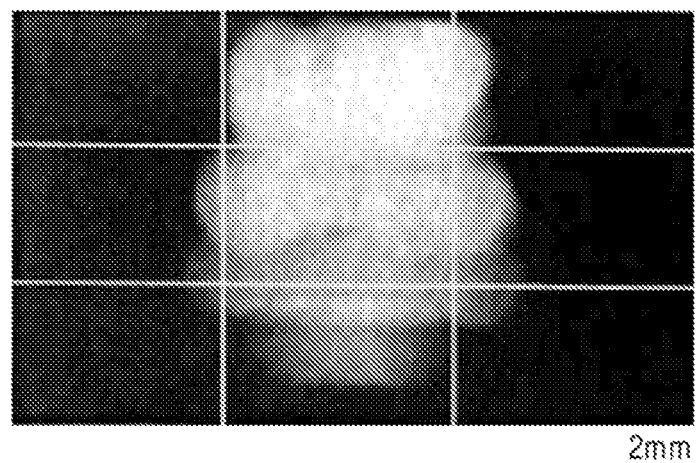
FIGS. 5A, 5B, 5C, and 5D are diagrams showing images captured in focus positions, respectively.
Figure 5B:
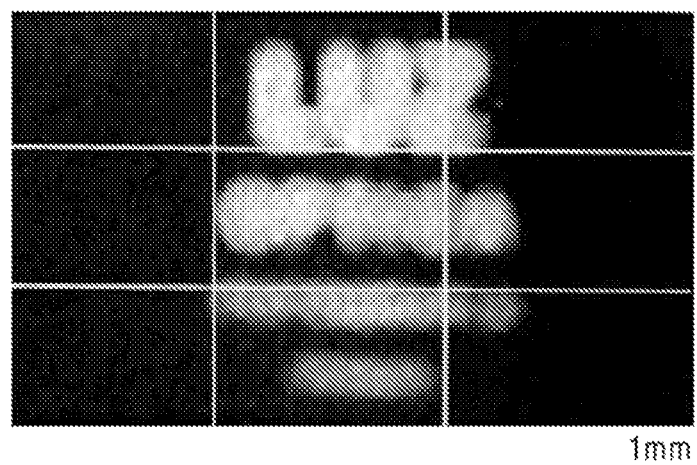
Figure 5C:
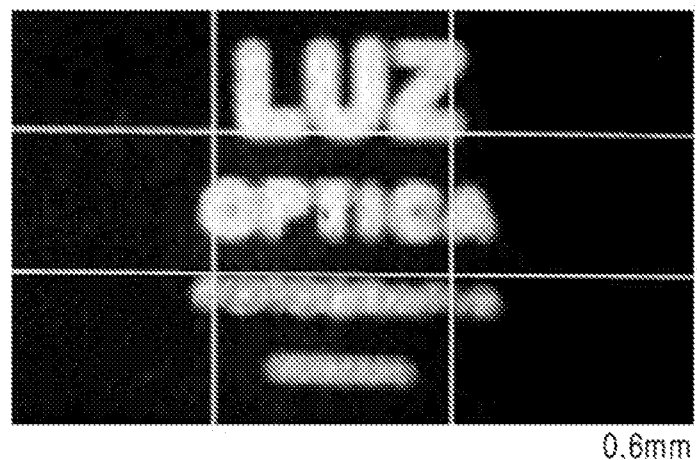
Figure 5D:
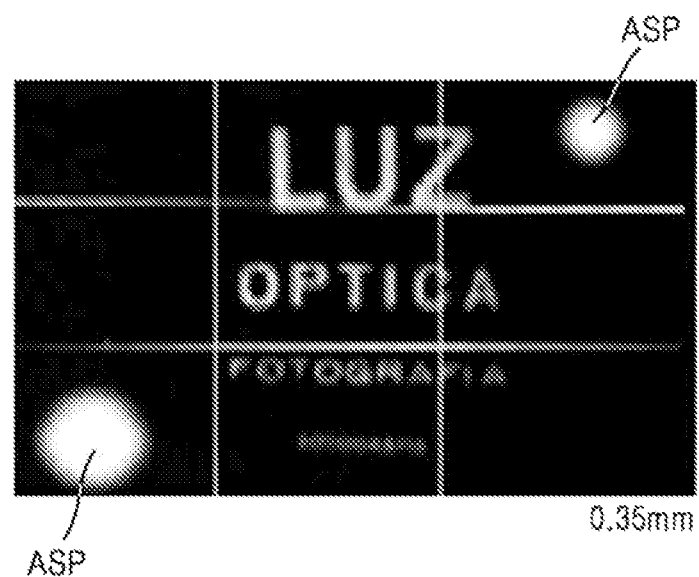

Compared to general objects, spot light may be a brighter object, and thus, a saturated object due to spot light may be detected. In particular, when spot light is captured in a dark environment in which the amount of visible rays is relatively low, this phenomenon may frequently occur. An area of the saturated object occurring due to the spot light may be gradually decreased as the focus position is shifted to an in-focus position. FIGS. 5A to 5D are example diagrams showing a change of an area of saturated objects occurring due to spot light of a neon sign. Referring to FIGS. 5A, 5B, 5C, and 5D, as the focus position is gradually changed to 2 millimeter (mm), 1 mm, 0.6 mm, and 0.35 mm, the saturated areas are gradually decreased in some regions. Thus, the saturated objects, such as "LUZ," "OPTICA," and "FOTOGRAFIA," may have improved discrimination. FIG. 5D illustrates an example in which temporary saturated objects ASP newly occur and are detected due to various factors, such as the flicker of new spot light, etc., in an image, when the focus position is 0.35 mm. The additional saturated objects ASP newly occurring in the image of FIG. 5D correspond to a case in which areas thereof are increased, compared to FIG. 5C. The areas of the additional saturated objects ASP are changed in a way opposite to a trend of the previous saturated objects, the areas of which are decreased. Thus, the region selecting portion 230 may determine regions in which the additional saturated objects ASP occur as the regions in which exception conditions occur and may not select the regions.

It may be assumed that the focus position may be adjusted according to a change of the entire saturated area included in the image, without dividing the image into a plurality of regions. As the focus position is changed, the entire saturated area may be gradually decreased, and then, reversely, the entire saturated area may be increased, due to the saturated objects ASP occurring due to various factors, such as the flicker of additional spot light, etc. In this case, the image capturing device may adjust the focus position in the opposite direction in response to the increase of the saturated area. This may denote that the previous saturated objects were becoming gradually vivid, as the focus position was changed, and then, the previous saturated objects may become faint again, as the focus position is adjusted in the opposite direction. As described above, the temporarily occurring spot light may interrupt the image capturing device from finding the in-focus position.

According to an embodiment of the disclosure, the focus controller 200 may monitor the saturated areas in a plurality of regions of the image, and when, regions, the saturated areas of which are gradually decreased, and a region, the saturated area of which is increased, are detected, as the focus position is changed, the focus controller 200 may select only the regions, the saturated areas of which are decreased, and may not select the region, the saturated area of which is increased. Also, the focus controller 200 may adjust the focus position based on the selected regions. Accordingly, the image capturing device for detecting the in-focus position with improved speed and accuracy may be provided.

Figure 6:
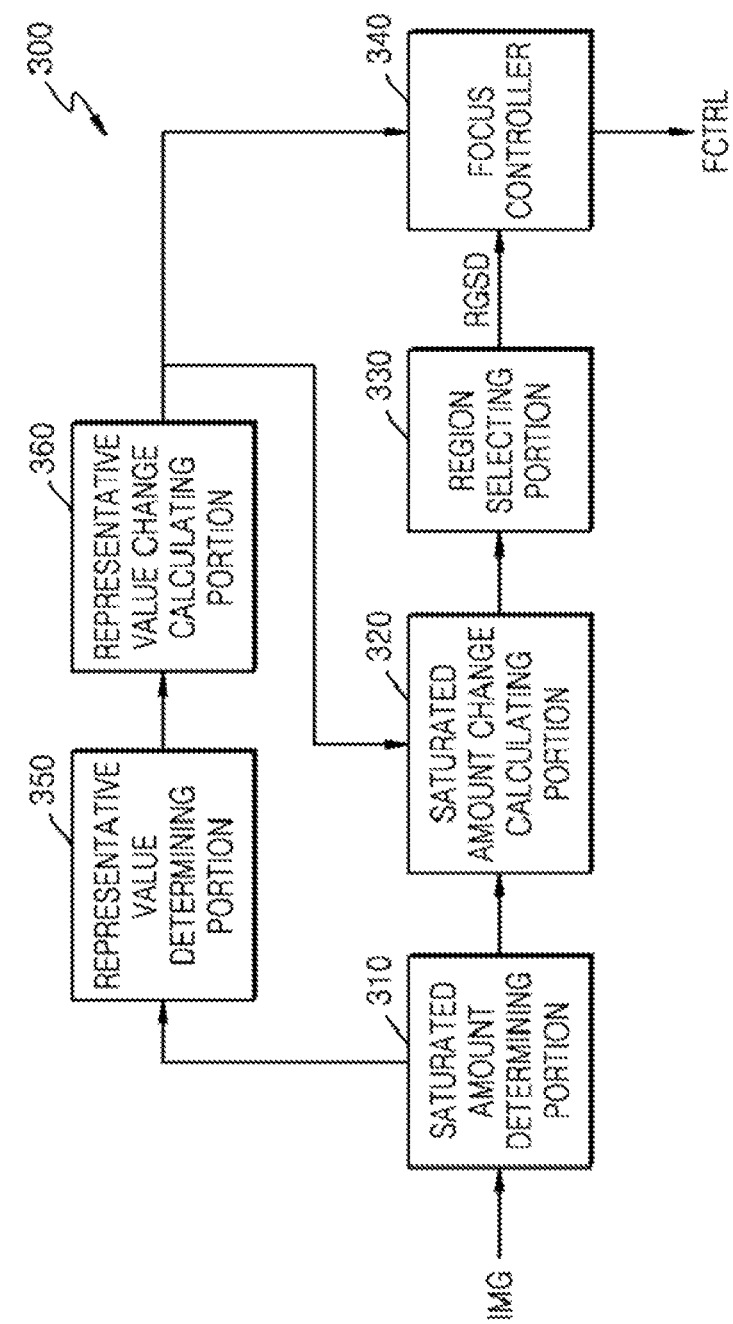
FIG. 6 is a block diagram of the focus controller of FIG. 2, according to another embodiment.

FIG. 6 is a block diagram of the focus controller of FIG. 2, according to another embodiment.

Referring to FIG. 6, the focus controller 300 may include a saturated amount determining portion 310, a saturated amount change calculating portion 320, a region selecting portion 330, a focus adjusting portion 340, a representative value determining portion 350, and a representative value change calculating portion 360.

The saturated amount determining portion 310 may be likewise configured as the saturated amount determining portion 210 of FIG. 3. Hereinafter, repeated descriptions are omitted.

A representative value with respect to intensities of pixels of each of saturated objects detected by the saturated amount determining portion 310 may be determined, and at least some of the saturated objects may be selected with reference to a change of the representative value, to perform operations of the saturated amount change calculating portion 320, the region selecting portion 330, and the focus adjusting portion 340.

According to embodiments, the representative value may include an average value and a variance value of the intensities of the pixels of the saturated object. The representative value determining portion 350 may receive data including area information of the saturated objects detected in the image IMG, from the saturated amount determining portion 310. The representative value determining portion 350 may calculate the average value and the variance value with respect to the intensities of each saturated object. The average value and the variance value with respect to each saturated object may be stored in the buffer memory 160 (see FIG. 3).

The representative value change calculating portion 360 may calculate a change (or a difference) of the average value and a change of the variance value with respect to corresponding saturated objects between the current image IMG and a previous image and may provide the calculated changes to the saturated amount change calculating portion 320. The average value and the variance value of the intensities corresponding to the saturated object of the previous image may be obtained from the buffer memory 160.

As a focus position is shifted to an in-focus position, an area of the saturated object may be decreased, but the intensity of the saturated object may be increased, and thus, the saturated object may be vividly represented in the image IMG. Thus, as the focus position is shifted to the in-focus position, the average value of the saturated object may be increased, and the variance value of the saturated object may be decreased. Compared to an intensity of spot light, an intensity of an object (for example, a white wall surface having high brightness or light reflected from the walls surface) other than the spot light is non-uniform, and thus, a variance value of a saturated object caused by the object other than the spot light may be greater than a variance value of a saturated object caused by the spot light.

For example, when the focus position is shifted to 2 mm, 1 mm, 0.6 mm, and 0.35 mm, the saturated object due to spot light may be vividly represented in the image IMG, and thus, the average value may be increased, and the variance value may be decreased. On the contrary, an object other than spot light, for example, an object having a bright color (for example, white) may be detected as a saturated object. However, when the object is vividly represented as the focus position is shifted to the in-focus position, the variance value, for example, may be increased due to texture representation of the corresponding object. Thus, by referring to the average value and/or the variance value, it may be determined whether the detected saturated object is due to spot light or not. According to an embodiment of the disclosure, the average value and/or the variance value of the saturated object may be used as reliability information of spot light, and thus, an error of determining an object other than spot light as spot light may be minimized.

According to an embodiment, the saturated amount change calculating portion 320 may calculate a change of an area of the saturated object detected by the saturated amount determining portion 310 as a change of the saturated amount, but may exclude a region in which the object other than the spot light is detected as the saturated object, by taking into account the variance value of the saturated object. The saturated amount change calculating portion 320 may primarily select regions in which saturated objects, variance values of which are gradually decreased, from among the saturated objects, are detected, and may calculate the change of the area of each of the saturated objects of the primarily selected regions. The region selecting portion 330 may secondarily select a region in which saturated objects having the same change of the area from among the saturated objects of the primarily selected regions are detected and may not select a region in which a saturated object having an irregular and/or temporary change of the area is detected. The present embodiment may be effective for an embodiment in which the focus position is adjusted based on the saturated object caused by spot light. According to the present embodiment, by verifying and selecting whether the saturated object detected by the saturated amount determining portion 310 is caused by spot light, the adjusting of the focus position based on the selected saturated objects may have improved reliability.

According to other embodiments, the representative value may include a DC value and an AC value obtained by performing DCT on the intensities of the saturated area. The representative value determining portion 350 may determine the DC value and the AC values by performing DCT on the intensities of the saturated object detected by the saturated amount determining portion 310. The determined DC and AC values may be stored in the buffer memory 160.

The representative value change calculating portion 360 may calculate a change of the DC value and a change of the AC value with respect to corresponding saturated objects between the current image IMG and a previous image and may provide the calculated changes to the saturated amount change calculating portion 320. The DC value and the AC value corresponding to the saturated object of the previous image may be obtained from the buffer memory 160.

The saturated object caused by spot light may have an increased DC value and a decreased AC value as the focus position is shifted to the in-focus position. However, the saturated object caused by an object other than spot light may have an increased DC value and an increased AC value as the focus position is shifted to the in-focus position. Thus, with reference to the DC value and/or the AC value, whether the saturated object is caused by spot light or not may be determined. According to an embodiment of the disclosure, the DC value and/or the AC value of the saturated object may be used as reliability information of the spot light, and thus, an error of determining an object other than spot light as spot light may be minimized.

According to an embodiment, the saturated amount change calculating portion 320 may calculate a change of an area of the saturated object detected by the saturated amount determining portion 310 as a change of the saturated amount, but may exclude a region in which the object other than the spot light is detected as the saturated object, by taking into account the AC value of the saturated object. The saturated amount change calculating portion 320 may primarily select regions in the image IMG, in which saturated objects, AC values of which are gradually decreased, from among the saturated objects, are detected, and may calculate the change of the area of each of the saturated objects of the primarily selected regions. The region selecting portion 330 may secondarily select a region in which saturated objects having the same change of the area from among the saturated objects of the primarily selected regions are detected and may not select a region in which a saturated object having an irregular and/or temporary change of the area is detected. As described above, by verifying and selecting whether the detected saturated object is caused by spot light or not, with reference to the change value of the DC value and/or the change value of the AC value, the adjusting of the focus position based on the selected saturated objects may have improved reliability.

Also, the focus adjusting portion 340 may adjust the focus position by further referring to a change of a representative value with respect to the intensities of the pixels of the saturated object in the selected region, in addition to the change value of the saturated area corresponding to the selected region as described above with reference to FIG. 3.

According to embodiments, the representative value may include an average value and a variance value of the intensities of the pixels of the saturated object. As described above, when the saturated object is caused by spot light, the spot light may be vividly represented in the image IMG as the focus position is shifted to the in-focus position, and thus, the saturated area may be decreased, the average value may be increased, and the variance value may be decreased. Accordingly, by referring to the average value and/or the variance value for adjusting the focus position, improved reliability may be secured, with respect to an embodiment, in particular, in which the in-focus position is detected based on the spot light. The focus adjusting portion 340 may adjust the focus position by further referring to changes of average values and changes of variance values of the saturated objects in the selected regions, in addition to the changes of saturated areas of the selected regions. For example, as a decreasing width of the variance value of the saturated object is decreased, the adjusting amount of the focus position may be decreased. According to embodiments, the adjusting amount of the focus position may be determined by assigning an appropriate weight to each of the change of the saturated area, the change of the intensity average value of the saturated object, and the change of the intensity variance value of the saturated object.

According to other embodiments, the representative value may include a DC value and an AC value obtained by performing DCT on the intensities of the pixels of the saturated object. The focus adjusting portion 340 may adjust the focus position by further referring to changes of the DC values and changes of AC values of the saturated objects in the selected regions, in addition to the changes of the saturated areas of the selected regions. For example, as a decreasing width of the AC value of the saturated object is decreased, the adjusting amount of the focus position may be decreased. According to embodiments, the adjusting amount of the focus position may be determined by assigning an appropriate weight to each of the change of the saturated area, the change of the DC value of the saturated object, and the change of the AC value of the saturated object.

According to an embodiment illustrated in FIG. 6, the representative value of the saturated object may be used as additional information with respect to the change of the area of the saturated object. As the focus position is shifted to the in-focus position, a change of the representative value of the saturated object may be constant. Thus, instead of the change of the area of the saturated object, the representative value of the saturated object may be used to select the regions for adjusting the focus position.

For example, the representative value determining portion 350 of FIG. 6 may be included in the saturated amount determining portion 310, and the representative value change calculating portion 360 may be included in the saturated amount change calculating portion 320. The saturated amount determining portion 310 may detect at least one saturated object in the image IMG and may calculate the representative value of the saturated object as the feature of the saturated object and output the calculated feature of the saturated object to the saturated amount change calculating portion 320. The saturated amount change calculating portion 320 may calculate the feature change of each of the saturated objects detected in the images IMG that are input according to a time order. Here, the feature change may include a change of the representative value of the saturated object, that is, a change of the average value and/or the variance value, or a change of a DC value and/or an AC value of DCT. The region selecting portion 230 may select regions in which there are saturated objects having the same trend (an increase or a decrease) of the feature change according to time, and may not select a region in which there is a saturated object having the opposite trend of the feature change by determining that an irregular or temporary exception condition occurs in that region. As the focus position is shifted to the in-focus position, the average value of the saturated object may be increased, and the variance value may be decreased. As the focus position is shifted to the in-focus position, the DC value of the saturated object may be increased, and the AC value may be decreased.

According to an embodiment, the saturated amount change calculating portion 320 may calculate the change of the average value and/or the variance value of the saturated object, detected by the saturated amount determining portion 310, as the change of the saturated amount. The region selecting portion 330 may select regions having the same change of the average value and/or variance value of the saturated object, from among the plurality of regions of the image IMG, and may not select a region having an irregular and/or temporary change of the average value and/or the variance value.

According to another embodiment, the saturated amount change calculating portion 320 may calculate the change of the DC value and/or the AC value calculated by applying DCT on the detected saturated object, detected by the saturated amount determining portion 310, as the change of the saturated amount. The region selecting portion 330 may select regions having the same change of the DC value and/or the AC value of the saturated object, from among the plurality of regions of the image IMG, and may not select a region having an irregular and/or temporary change of the DC value and/or the AC value.

Figure 7:
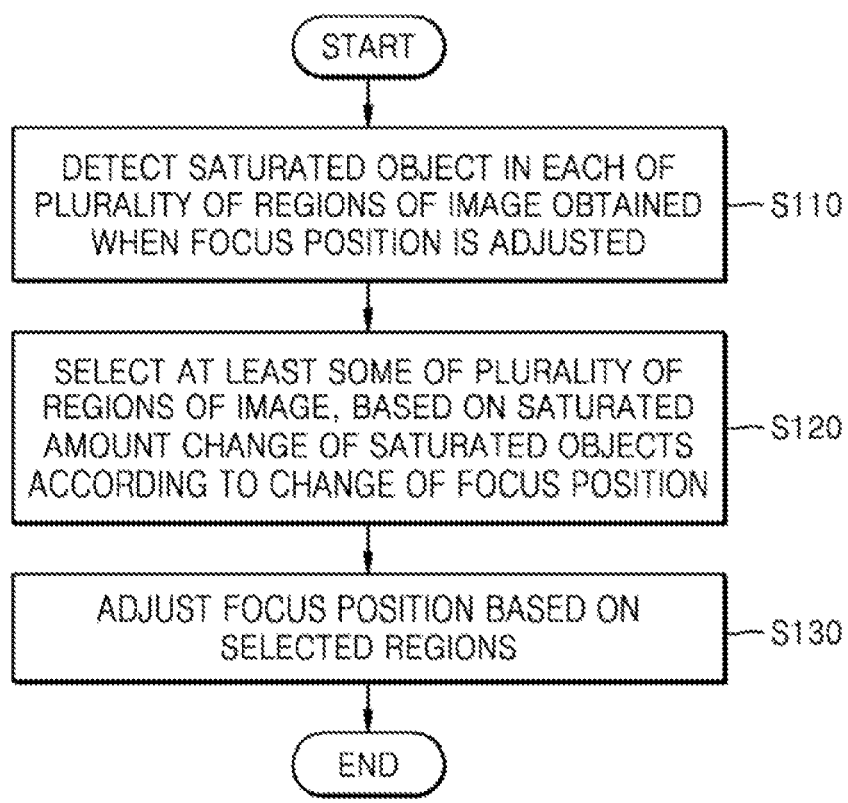
FIG. 7 is a flowchart of a method of performing autofocus, according to an embodiment of the disclosure.
Figure 8:
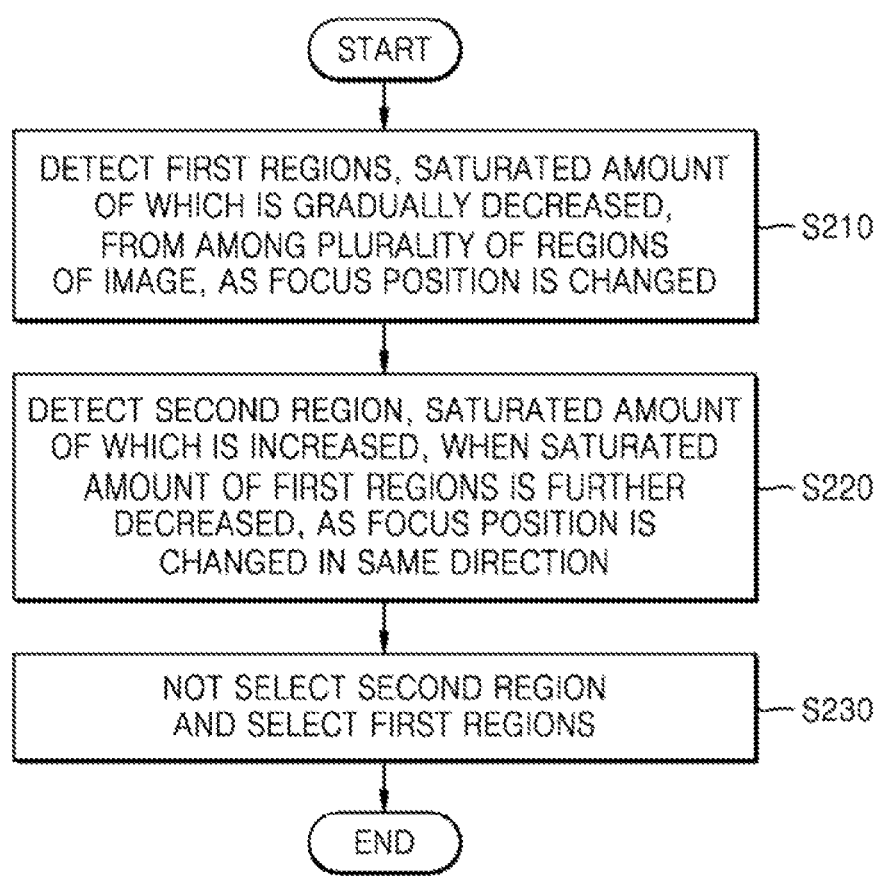
FIG. 8 is a flowchart of operation S120 of FIG. 7, according to an embodiment.

FIG. 7 is a flowchart of a method of performing AF, according to an embodiment of the disclosure. FIG. 8 is a flowchart showing operation S120 of FIG. 7, according to an embodiment.

According to embodiments, operations S110 to S130 of FIG. 7 may be performed by the focus controller 150 of the image capturing device 100 of FIG. 2, the focus controller 200 illustrated in FIG. 3, or the focus controller 300 illustrated in FIG. 6. Detailed descriptions of the same aspects as described with reference to FIGS. 1 to 6 are omitted.

Referring to FIG. 7, in operation S110, a saturated object may be detected in each of a plurality of regions of each of images obtained when a focus position is adjusted. A feature change corresponding to a change of the saturated amount of the detected saturated object may be monitored.

In operation S120, based on the change of the saturated amount of the saturated object according to a change of the focus position, at least some of the plurality of regions of the image may be selected. In more detail, referring to FIG. 8, in operation S210, first regions in which the saturated amount is gradually decreased as the focus position is changed, from among the plurality of regions of the image, may be detected. In operation S220, when, as the focus position is changed in the same direction, the saturated amounts of the first regions are further decreased, a second region in which the saturated amount is reversely increased may be detected. In this case, in operation S230, the second region may not be selected, and the first regions may be selected for adjusting the focus position. The saturated amount may be at least one of an area of the saturated object, an average value and a variance value of the saturated object, and DCT data including a DC value and an AC value of the saturated object.

From among regions in which the saturated object is detected from among the plurality of regions of the image, regions having the same trend of the feature change of the saturated object while the focus position is changed in a direction may be selected as first regions, and other regions may be excluded as second regions.

According to an embodiment, the regions in which the saturated object, an area of which is gradually decreased while the focus position is changed in the direction, is detected, as the first regions. According to another embodiment, the regions in which there are the saturated objects having the same increase and decrease direction of at least one of the average value and the variance value while the focus position is changed in the direction may be selected as the first regions. According to another embodiment, the regions in which the saturated objects having the same increase and decrease direction of at least one of the DC value and the AC value of the DCT data are detected, may be selected as the first regions.

According to another embodiment, from among the plurality of regions of the image, the regions in which there is the saturated object, the average value of which is increased, and the variance value of which is decreased, while the focus position is changed in the direction, may be selected, and from among the selected regions, the regions in which the saturated object, the area of which is gradually decreased, is detected, may be selected as the first regions. According to another embodiment, from among the plurality of regions of the image, the regions in which there is the saturated object, the DC value of the DCT data of which is increased, and the AC value of which is decreased, while the focus position is changed in the direction, may be selected, and from among the selected regions, the regions in which the saturated object, the area of which is gradually decreased, is detected, may be selected as the first regions.

Referring to FIG. 7 again, in operation S130, the focus position may be adjusted based on the selected regions. The focus position may be adjusted based on the feature change of the saturated objects detected in the first regions. According to various methods known in this art, the focus position may be adjusted by referring to at least one of a saturated area and/or a change value of the saturated area, an average value/variance value and/or a change value of the average value/variance value, and a DC value/AC value calculated by DCT and/or a change value of the DC value/AC value. According to an embodiment, the focus position may be adjusted such that the area of the saturated objects detected in the first regions is minimized. According to another embodiment, the focus position may be adjusted such that the average value of the saturated objects detected in the first regions is maximized, and the variance value is minimized. According to another embodiment, the focus position may be adjusted such that the DC value of the DCT data of the saturated objects detected in the first regions is maximized, and the AC value is minimized. Here, image information about the non-selected region may be excluded for adjusting the focus position, and at least one of the saturated area and/or the change amount of the saturated area, the average value/variance value and/or the change amount of the average value/variance value, and the DC value/AC value calculated by DCT and/or the change amount of the DC value/AC value of the selected regions may be referred to.

According to another embodiment, operations S110 to S130 of FIG. 7 may be performed by a network device outside the image capturing device 100 of FIG. 2. In this case, the image capturing device 100 and the network device each may include a communicator for performing wired/wireless communication with each other, and the network device may receive, from the image capturing device 100, image IMG and/or data associated with the saturated object detected from each of the plurality of regions of the image IMG and may use the received data to perform operations S110 to S130 of FIG. 7.

Figure 9:
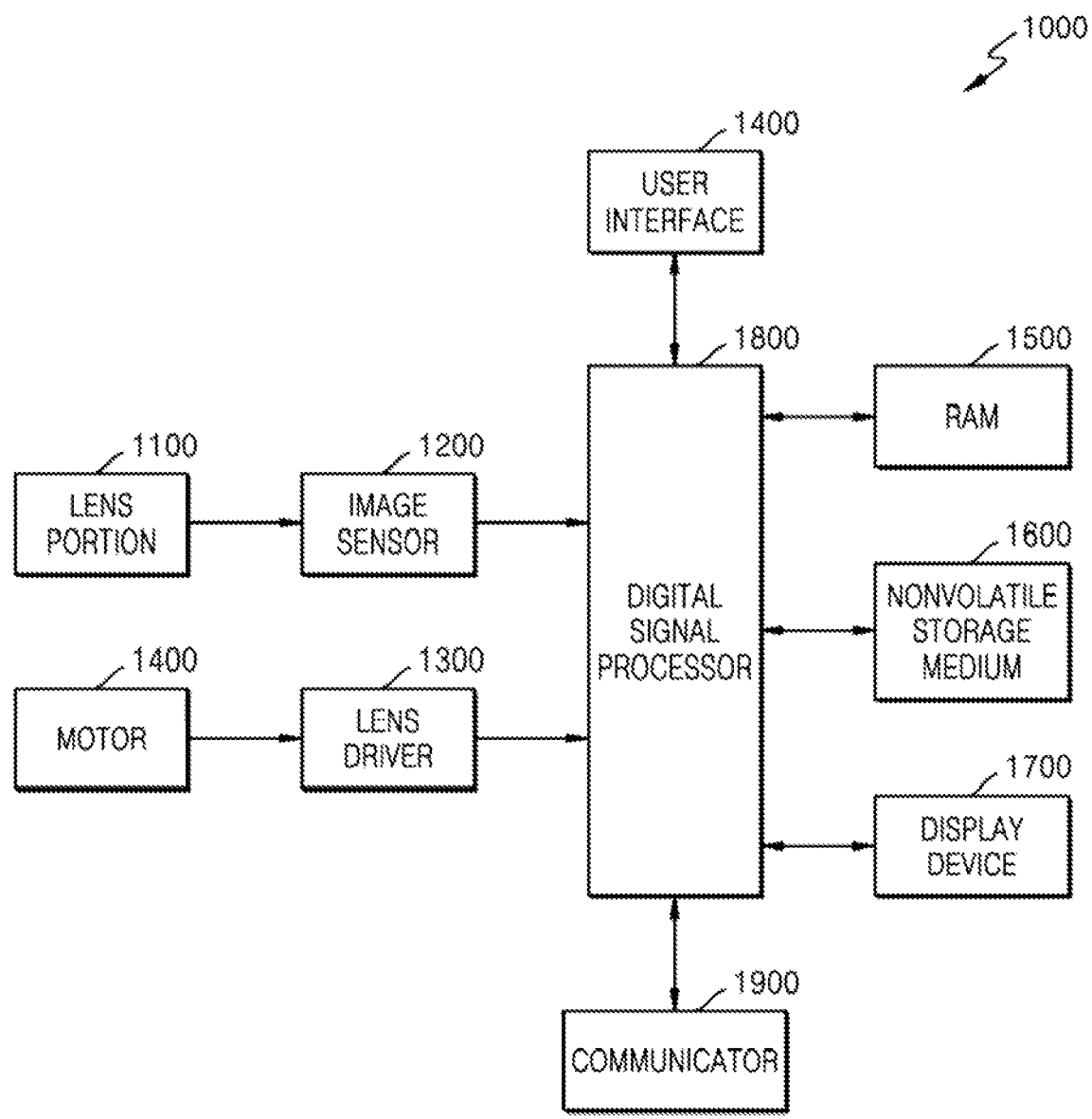
FIG. 9 is a block diagram of a computer device appropriate for realizing the image capturing device of FIG. 2.

FIG. 9 is a block diagram of a computer device appropriate for realizing the image capturing device of FIG. 2.

Referring to FIG. 9, a computer device 1000 may include a lens portion 1100, an image sensor 1200, a lens driver 1300, a motor 1350, a user interface 1400, a random-access memory (RAM) 1500, a nonvolatile storage medium 1600, a display device 1700, a digital signal processor 1800, and a communicator 1900.

The lens portion 1100 may receive light from an object. The image sensor 1200 may convert the received light into an electrical signal. The image sensor 1200 may digitalize the electrical signal into an appropriate gain value to generate an image. For example, the image sensor 1200 may include an analog-to-digital converter.

The lens driver 1300 may be configured to control an operation of the motor 1400 in response to control by the digital signal processor 1800, and the motor 1400 may be configured to drive the lens portion 1100. The lens portion 1100, the image sensor 1200, the lens driver 1300, and the motor 1350 may be provided as the lens portion 110, the image sensor 140, the lens driver 170, and the motor 180 described with reference to FIG. 2.

The user interface 1400 may sense a user input for controlling an operation of the computer device 1000 and generate a corresponding input command. The user interface 1400 may include an input device, such as a key pad, a mouse, a finger scan sensor, a dome switch, a touch pad, and a jog wheel, which may sense a command or information based on a user's manipulation.

The RAM 1500 may include at least one of various types of memories, such as static RAM (SRAM), dynamic RAM (DRAM), synchronous DRAM (SDRAM), etc. The RAM 1500 may be provided as a working memory of the digital signal processor 1800. The RAM 1500 may be provided as the buffer memory 160 of FIG. 2. FIG. 9 illustrates that the RAM 1500 is a separate component from the digital signal processor 1800. However, it is an example, and at least a portion of the RAM 1500 may be included in the digital signal processor 1800.

The nonvolatile storage medium 1600 may include various types of storage media retaining stored data even when power is blocked, for example, flash memory, hard disc, etc.

The display device 1700 may display information processed by the computer device 1000 according to control by the digital signal processor 1800.

The digital signal processor 1800 may be configured to control general operations of the computer device 1000. The digital signal processor 1800 may operate in response to an input command received through the user interface 1400 and may process an image received through the image sensor 1200. The digital signal processor 1800 may perform the operations of the focus controller 150 of FIG. 2. The digital signal processor 1800 may load instructions for executing the operations (or steps) described with reference to FIGS. 2 to 6 or computer programs including the instructions in the RAM 1500 from the nonvolatile storage medium 1600 and may execute the loaded instructions or computer programs.

According to embodiments, some of the operations of the focus controller 150 of FIG. 2 may be performed by the digital signal processor 1800, and the others of the operations of the focus controller 150 may be performed by a network device outside the computer device 1000. For example, the network device may perform the operations of the saturated amount change calculating portion 220, the region selecting portion 230, and the focus adjusting portion 240 of FIG. 3. In this case, the computer device 1000 may further include a communicator 1900 for performing wired/wireless communication with the network device.

Although particular embodiments and application examples are described herein, these are provided for help with the general understanding of the disclosure, and the disclosure is not limited to the embodiments described above. One of ordinary skill in the art may achieve various modifications and alterations from the descriptions.

Therefore, the concept of the disclosure shall not be defined as being limited to the embodiments described above, and in addition to the scope of the claims described below, all that are equivalent or include equivalent alterations to the scope of the claims shall be included in the range of the concept of the disclosure.

The invention claimed is:

1. An image capturing device comprising:
a lens;
a lens driver configured to change a focus position by moving the lens;
an image sensor configured to detect light passed through the lens; and
a focus controller configured to control, based on an image generated by the image sensor, the lens driver to adjust the focus position,
wherein the focus controller is further configured to:
detect a saturated object having an intensity greater than or equal to a threshold value, in each of a plurality of regions of the image;
from among regions in which the saturated objects are detected from among the plurality of regions, select regions having a same trend of a feature change of the saturated objects while the focus position is changed in a direction, as first regions, and adjust the focus position based on the feature change of the saturated objects detected in the first regions.

2. The image capturing device of claim 1, wherein the focus controller is further configured to select regions in which saturated objects, an area of each of which is gradually decreased while the focus position is changed in the direction, are detected, as the first regions, and adjust the focus position such that the areas of the saturated objects detected in the first regions are minimized.

3. The image capturing device of claim 2, wherein the area of each saturated object corresponds to the number of pixels included in the saturated object.

4. The image capturing device of claim 1, wherein the focus controller is further configured to:
calculate an average value and a variance value of pixel values of pixels included in the saturated objects; and
select regions in which there are saturated objects having a same increase and decrease direction of at least one of the average value and the variance value while the focus position is changed in the direction, as the first regions, and adjust the focus position such that the average value of the saturated objects detected in the first regions is maximized, and the variance value is minimized.

5. The image capturing device of claim 1, wherein the focus controller is further configured to:
calculate a direct current value and an alternating current value by performing discrete cosine transformation on the saturated objects, and
select regions in which saturated objects having a same increase and decrease direction of at least one of the direct current value and the alternating current value while the focus position is changed in the direction are detected, as the first regions, and adjust the focus position such that the direct current value of the saturated objects detected in the first regions is maximized, and the alternating current value is minimized.

6. The image capturing device of claim 1, wherein the focus controller is further configured to:
calculate an average value and a variance value of pixel values of pixels included in the saturated objects; and
exclude a first region in which there is a saturated object, the average value of which is increased, and the variance value of which is increased, while the focus position is changed in the direction.

7. The image capturing device of claim 1, wherein the focus controller is further configured to:
calculate a direct current value and an alternating current value by performing discrete cosine transformation on the saturated objects; and
exclude a first region in which there is a saturated object, the direct current value of which is increased, and the alternating current value of which is increased, while the focus position is changed in the direction.

8. The image capturing device of claim 1, wherein the focus controller is further configured to:
calculate an average value and a variance value of pixel values of pixels included in the saturated objects; and
select, from among the plurality of regions, regions in which there are saturated objects, the average value of each of which is increased, and the variance value of each of which is decreased, while the focus position is changed in the direction, and from among the selected regions, select regions in which saturated objects, an area of each of which is gradually decreased, are detected, as the first regions.

9. The image capturing device of claim 1, wherein the focus controller is further configured to:
calculate a direct current value and an alternating current value by performing discrete cosine transformation on the saturated objects; and
select, from among the plurality of regions, regions in which there are saturated objects, the direct current value of each of which is increased, and the alternating current value of each of which is decreased, while the focus position is changed in the direction, and from among the selected regions, select regions in which saturated objects, an area of each of which is gradually decreased, are detected, as the first regions.

10. The image capturing device of claim 1, wherein the focus controller is further configured to detect the saturated objects having an intensity greater than or equal to the threshold value, when a low illumination environment in which there is spot light is determined.

11. The image capturing device of claim 1, wherein the focus controller is further configured to detect pixels greater than or equal to the threshold value in each of the plurality of regions and group the detected pixels to detect the saturated objects.

12. A method of changing a focus position of a camera, the method comprising:
detecting a saturated object having an intensity greater than or equal to a threshold value, in each of a plurality of regions of an image obtained by the camera;
from among regions in which the saturated objects are detected from among the plurality of regions, selecting regions having a same trend of a feature change of the saturated objects while the focus position is changed in a direction, as first regions; and
adjusting the focus position based on the feature change of the saturated objects detected in the first regions.

13. The method of claim 12, wherein the selecting of the first regions comprises selecting regions in which saturated objects, an area of each of which is gradually decreased while the focus position is changed in the direction, are detected, as the first regions, and
the adjusting of the focus position comprises adjusting the focus position such that the areas of the saturated objects detected in the first regions are minimized.

14. The method of claim 13, wherein the area of each saturated object corresponds to the number of pixels included in the saturated objects.

15. The method of claim 12, further comprising calculating an average value and a variance value of pixel values of pixels included in the saturated objects,
wherein the selecting of the first regions comprises selecting regions in which there are saturated objects having a same increase and decrease direction of at least one of the average value and the variance value while the focus position is changed in the direction, as the first regions, and
the adjusting of the focus position comprises adjusting the focus position such that the average value of the saturated objects detected in the first regions is maximized, and the variance value is minimized.

16. The method of claim 12, further comprising calculating a direct current value and an alternating current value by performing discrete cosine transformation on the saturated objects,
wherein the selecting of the first regions comprises selecting regions in which saturated objects having a same increase and decrease direction of at least one of the direct current value and the alternating current value while the focus position is changed in the direction are detected, as the first regions, and
the adjusting of the focus position comprises adjusting the focus position such that the direct current value of the saturated objects detected in the first regions is maximized, and the alternating current value is minimized.

17. The method of claim 12, further comprising calculating an average value and a variance value of pixel values of pixels included in the saturated objects, wherein the selecting of the first regions comprises selecting, from among the plurality of regions, regions in which there are saturated objects, the average value of each of which is increased, and the variance value of each of which is decreased, while the focus position is changed in the direction, and from among the selected regions, selecting regions in which saturated objects, an area of each of which is gradually decreased, are detected, as the first regions.

18. The method of claim 12, further comprising calculating a direct current value and an alternating current value by performing discrete cosine transformation on the saturated objects, wherein the selecting of the first regions comprises selecting, from among the plurality of regions, regions in which there are saturated objects, the direct current value of each of which is increased, and the alternating current value of each of which is decreased, while the focus position is changed in the direction, and from among the selected regions, selecting regions in which saturated objects, an area of each of which is gradually decreased, are detected, as the first regions.

19. The method of claim 12, wherein the detecting of the saturated objects comprises detecting the saturated objects, when a low illumination environment in which there is spot light is determined.

20. The method of claim 12, wherein pixels greater than or equal to the threshold value are detected in each of the plurality of regions and the detected pixels are grouped to detect the saturated objects.

\* \* \* \* \*